United States Patent Office

3,331,755
Patented July 18, 1967

3,331,755
EXTRACTIVE DISTILLATION OF 2,6-XYLENOL WITH GLYCOL
Martin B. Neuworth, Pittsburgh, Pa., assignor to Consolidation Coal Company, Pittsburgh, Pa., a corporation of Pennsylvania
No Drawing. Filed Dec. 18, 1964, Ser. No. 419,585
5 Claims. (Cl. 203—59)

The present invention relates to a process for recovering 2,6-xylenol (i.e., 2,6-dimethylphenol) from its admixture with closely boiling methyl-substituted phenols. More particularly, it relates to a process for the separation and recovery of 2,6-xylenol from its admixture with meta-cresol and para-cresol. Still more particularly, the present invention relates to the recovery of 2,6-xylenol which is substantially free of meta- and para-cresols from mixtures containing these two compounds.

2,6-xylenol is a naturally-occurring phenol found in the cresol distillate derived from low temperature carbonization of bituminous coal. It also occurs in petroleum cresylics, in coke oven tars, oil shale distillates, coal hydrogenation oils and the like. Its boiling temperature is above that of ortho-cresol and slightly below that of meta- and para-cresol at 760 mm. Accordingly, it is concentrated in what is normally termed the cresol distillate, that is, the distillate fraction boiling in the approximate range of 190 to 210° C. at 760 mm.

Not only does 2,6-xylenol appear in naturally-occurring phenols, but it also appears in certain phenolic reaction products. For example, the isomerization of o-cresol produces significant quantities of 2,6-xylenol. The isomate contains 2,6-xylenol in admixture with meta- and para-cresols and unreacted ortho-cresol. The catalytic methylation of either phenol or o-cresol provides mixtures containing 2,6-xylenol. For the purpose of the present invention, these reaction products boiling within the range of about 190 to 210° C. are also called cresol distillates.

2,6-xylenol is a valuable material for use in anti-oxidants, plasticizers and the like. It is also useful as a monomer in the preparation of polymers. (See Journal of the American Chemical Society 81: 6335-36 (1959); Journal of Polymer Science 58: 581-591; idem 58: 593-609; and idem 58: 469-90.)

The problem of separating 2,6-xylenol from cresol distillate fractions becomes apparent upon examination of the following Table I wherein the boiling points at different pressures are listed for the several components of the cresol distillate fraction.

TABLE I

| | 20 mm. | 50 mm. | 100 mm. | 760 mm. |
|---|---|---|---|---|
| o-Cresol | 90° C | 109° C | 125.5° C | 190.8° C. |
| m-Cresol | 101° C | 120° C | 138° C | 202.2° C. |
| p-Cresol | 101° C | 120° C | 138° C | 202.2° C. |
| 2,4-xylenol | 105° C | 125° C | 143° C | 210° C. |
| 2,5-xylenol | 105° C | 125° C | 143° C | 210° C. |
| 2,6-xylenol | 95° C | 116° C | 133° C | 202° C. |
| o-Ethylphenol | 101° C | 121.5° C | 138.5° C | 203.7° C. |

Accordingly, the primary object of this invention is to provide a method of recovering 2,6-xylenol from its admixture with methyl-substituted phenols, i.e., cresols and/or xylenols.

In accordance with the present invention, a method is provided for separating 2,6-xylenol from its admixture with closely boiling methyl-substituted phenols by contacting the admixture in an extractive distillation zone with a polyalkylene glycol having the following general formula:

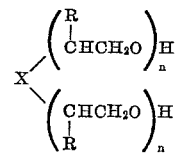

where X is one of O, S, and NH; each R is either $CH_3$ or H; and each $n$ is either 1 or 2.

I have found that the presence of the defined glycol has a marked effect on the relative volatility of 2,6-xylenol with respect to each of the other components of the admixture, and particularly with respect to meta- and para-cresols. The effect of the glycol is to disproportionately increase the volatility of the 2,6-xylenol. In fact, if sufficient glycol is present, the boiling point of the 2,6-xylenol will be below even that of ortho-cresol, which normally distills first from a cresol distillate. Of the glycols of this invention, diethylene glycol and triethylene glycol are preferred because of their outstanding effectiveness.

The effect of the glycols of this invention upon the separation and recovery of 2,6-xylenol from its admixture with other close boiling methyl phenols may be most dramatically demonstrated by a comparison of the relative volatility of 2,6-xylenol with respect to each of the phenols in the absence of, and in the presence of, the glycol.

The relative volatility of 2,6-xylenol with respect to a given component was determined as follows. The equipment consisted of a one-liter two-necked flask, immersed in a heating bath, equipped with a thermometer well, magnetic stirrer and a reflux condenser. The top joint of the condenser was connected to a vacuum pump. The temperature of the cooling water of the condenser could be varied from 15 to 100° C. A small glass cup was fastened by a copper wire and a hook in a position directly below the tip of the reflux condenser. Mixtures of 2,6-xylenol with various methyl-substituted phenols and glycols were refluxed in the flask at the desired pressure, generally at 100 mm. Hg, in some cases at 50 mm. Hg. The composition of the reflux filling and overflowing the cup below the condenser, was identical with the composition of the vapor which was in equilibrium with the boiling mixture.

A mixture of 2,6-xylenol, another close boiling methyl phenol and a polyalkylene glycol (total amount 200 to 300 grams) was charged into the flask, the stirrer was started, the desired pressure was set and the mixture was brought to boiling by gradually increasing the temperature of the heating bath. After a 10 to 15 minute period of smooth refluxing, equilibrium conditions were reached and the vacuum was released by letting in dry air or nitrogen. The flask was lifted from the bath; the joint between the flask and the condenser was opened for a short period and a sample was taken from the cup with a syringe. The composition of the sample was determined by G.L.C. analysis. The same procedure was carried out three times at every experimental condition. Occasionally, when the mixture contained a small amount of moisture, the liquid had a tendency to bump. In that case, the temperature of the cooling water was raised to 50 to 80° C. during refluxing and in about 2 to 3 minutes the moisture content was removed.

The above method of determining relative volatilities is based on the method of Wiley and Harder described in Laboratory Fractional Distillation, by Thomas P. Carney, p. 189, The Macmillan Company, New York (1949). The reproducibility of the method was good. The average deviation of most of the relative volatility values was around one percent and never exceeded three percent.

The value of the relative volatility, $\alpha$, was calculated by the equation $$\alpha = \frac{Y_A/Y_B}{X_A/X_B}$$

where $X_A$ and $Y_A$ are the weight (or mole) fractions of the lower boiling component in the liquid and vapor phase and $X_B$ and $Y_B$ the weight (or mole) fractions of the higher boiling component in the liquid and vapor phases, respectively.

The effect of diethylene glycol on the relative volatility of 2,6-xylenol (as expressed by the value of $\alpha$) in admixture with meta- and para-cresols is set forth in the following Table II. The composition of the mixture of phenols was 50 weight percent of 2,6-xylenol, 35 weight percent of meta-cresol and 15 weight percent of para-cresol. To this mixture different amounts of diethylene glycol were added, and the values of $\alpha$ were determined at different temperatures and pressures as shown in Table II.

TABLE II

| Amt. of Diethylene Glycol Wt. Percent of Mixture of Phenols | $\alpha$ | Liquid Temp., °C. | Pressure, mm. Hg |
|---|---|---|---|
| 0 | 1.21 | 137 | 100 |
| 25 | 1.56 | 143 | 100 |
| 50 | 1.76 | 147 | 100 |
| 100 | 1.90 | 153 | 100 |
| 0 | 1.25 | 118 | 50 |
| 100 | 2.03 | 136 | 50 |

The effect of triethylene glycol on the relative volatility of 2,6-xylenol (as expressed by the value of $\alpha$) in admixture with ortho-cresol is set forth in the following Table III. The composition of the mixture of phenols was 50 weight percent of 2,6-xylenol and 50 weight percent of ortho-cresol. To this mixture different amounts of triethylene glycol were added, and the values of $\alpha$ were determined at different temperatures, and at 100 mm. Hg pressure as shown in Table III.

TABLE III

| Amt. of Triethylene Glycol Wt. Percent of Mixture of | $\alpha$ | Liquid Temp., °C. |
|---|---|---|
| 0 | 0.79 | 130 |
| 25 | 0.97 | 135 |
| 50 | 1.10 | 142 |
| 100 | 1.21 | 154 |

The effect of diethanolamine on the relative volatility of 2,6-xylenol (as expressed by the value of $\alpha$) in admixture with 2,4-xylenol and 2,5-xylenol is set forth in the following Table IV. The composition of the mixture of phenols was 25 weight percent of 2,6-xylenol, 37.5 weight percent of 2,4-xylenol, and 37.5 weight percent of 2,5-xylenol. To this mixture different amounts of diethanolamine were added, and the values of $\alpha$ were determined at 100 mm. Hg pressure and at temperatures in the range of about 140 to 150° C.

TABLE IV

| Amt. of diethanolamine wt. percent of mixture of phenols: | $\alpha$ |
|---|---|
| 0 | 1.47 |
| 25 | 1.79 |
| 50 | 2.03 |
| 100 | 1.99 |

The above tabulated results are illustrative of the effect on the relative volatility of 2,6-xylenol of the glycols of this invention. Similar results may be obtained by the addition of any of the following glycols to mixtures of methyl phenols containing 2,6-xylenol: diethylene glycol, triethylene glycol, dipropylene glycol, diethanolamine, and thiodiglycol ($OH \cdot CH_2 \cdot CH_2 \cdot S \cdot CH_2 \cdot CH_2 \cdot OH$). All of these glycols have boiling points well above those of cresol distillates so that solvent recovery is readily accomplished. My discovery has its most significant application to the recovery of 2,6-xylenol from mixtures containing meta- and para-cresols. Accordingly, the preferred embodiment of my invention is the use of one of the defined solvents in the recovery of 2,6-xylenol from such a mixture, as will now be described.

A mixture of phenols of the following composition was subjected to extractive distillation with triethylene glycol.

| | Percent |
|---|---|
| Light ends | 0.1 |
| 2,6-xylenol | 46.0 |
| o-Cresol | 12.8 |
| o-Ethylphenol | 1.1 |
| m,p-Cresol | 40.0 |

An extractive distillation column, with a ¾" diameter, 40" long packed section (equivalent to about 20 to 25 theoretical plates) was used. The pressure was maintained at 50 mm. Hg. The glycol was supplied continuously through a hypodermic needle reaching down from the top of the condenser into the upper section of the packing. The glycol feed rate was around 100 ml. per hour. The distillation flask (1 liter) was charged with 200 ml. of the 2,6-xylenol mixture. The glycol mixture was brought to boiling and after a one-hour period of total reflux, distillation was started. The average rate of distillation was 30 ml. per hour, the reflux ratio 3 to 1, so that the overall ratio of glycol to phenols in the column was about 1 to 1. About 80 percent by weight of the 2,6-xylenol in the original mixture was recovered from the distillate products substantially free of m,p-cresol, that is, less than one percent.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. The method of separating and recovering 2,6-xylenol from its admixture with closely boiling methyl-substituted phenols which comprises contacting said admixture in an extractive distillation zone with a glycol having the formula:

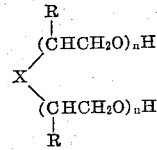

where X is one of O, S and NH; each R is one of $CH_3$ and H; and each $n$ is an integer from 1 to 2, and recovering a 2,6-xylenol fraction from the distillate products.

2. The method according to claim 1 in which the glycol is diethylene glycol.
3. The method according to claim 1 in which the glycol is triethylene glycol.
4. The method according to claim 1 in which the glycol is diethanolamine.
5. The method according to claim 1 in which the admixture of 2,6-xylenol with methyl-substituted phenols is a cresol distillate boiling within the range of about 190° to 210° C.

(References on following page)

References Cited

UNITED STATES PATENTS

| | | | |
|---|---|---|---|
| 2,265,939 | 12/1941 | Field | 203—64 |
| 2,339,576 | 1/1944 | Luten | 203—59 X |
| 2,360,655 | 10/1944 | Deanesly | 203—64 X |
| 2,789,143 | 4/1957 | Arnold et al. | 260—621 |
| 2,789,146 | 4/1957 | Neuworth. | |
| 2,969,401 | 1/1961 | Young et al. | |
| 3,169,101 | 2/1965 | Berthoux | 203—64 X |

FOREIGN PATENTS

| | | |
|---|---|---|
| 678,191 | 8/1952 | Great Britain. |
| 708,925 | 5/1954 | Great Britain. |

OTHER REFERENCES

Ind. and Eng. Chem. 35: pages 655–660 (1943).

NORMAN YUDKOFF, *Primary Examiner.*

F. E. DRUMMOND, *Assistant Examiner.*